United States Patent [19]

Soeda

[11] Patent Number: 4,804,900
[45] Date of Patent: Feb. 14, 1989

[54] CONTROL APPARATUS FOR SYNCHRONOUS MOTORS

[75] Inventor: Katsuji Soeda, Sukagawa, Japan

[73] Assignee: Yamamoto Electric Corporation, Fukushima, Japan

[21] Appl. No.: 188,329

[22] Filed: May 4, 1988

[51] Int. Cl.$^4$ .............................................. H02K 19/10
[52] U.S. Cl. ....................................... 318/719; 318/723
[58] Field of Search ................. 318/722, 723, 712–719, 318/778

[56] References Cited

U.S. PATENT DOCUMENTS

| | | | |
|---|---|---|---|
| 3,667,014 | 5/1972 | Merhof et al. | 318/715 |
| 3,696,278 | 10/1972 | Kyniyoshi et al. | 318/778 |
| 3,840,799 | 10/1974 | Macko et al. | 318/723 |
| 4,295,084 | 10/1981 | Nagase et al. | 318/719 |

*Primary Examiner*—David Smith, Jr.
*Attorney, Agent, or Firm*—Armstrong, Nikaido, Marmelstein & Kubovcik

[57] ABSTRACT

A synchronous motor control apparatus includes a polyphase synchronous motor, a frequency adjusting circuit responsive to the closing of a power supply switch to generate a frequency control signal for commanding to linearly increase an oscillation frequency from zero up to a given high frequency, a polyphase rectangular oscillation circuit whose oscillation frequency for polyphase rectangular waves is controlled in accordance with the frequency control signal, an energization phase adjusting circuit for generating a phase control signal in accordance with a signal related to the frequency control signal from the frequency adjusting circuit, an energization phase calculating circuit for controlling the phases of the polyphase rectangular oscillation frequency of the polyphase oscillation circuit, and a drive circuit for amplifying output polyphase rectangular signals of the energization phase calculating circuit and applying the same to a field winding of the motor.

9 Claims, 5 Drawing Sheets

CONTROL APPARATUS FOR SYNCHRONOUS MOTORS

BACKGROUND OF THE INVENTION

The present invention relates to a control apparatus for synchronous motors and more particularly to a synchronous motor control apparatus which is low in cost and simple in construction and is capable of easily effecting the required speed control.

It has been difficult in the past to start synchronous motors and the synchronous motors have required special starting devices thus making them complicated in construction and high in cost.

Also, it has been difficult to control the speed of the synchronous motor over a wide range of high to low speeds since the load current increases with a decrease in the motor speed.

In addition, the synchronous motor has heretofore used permanent magnets for its rotor and the use of powerfull magnets has been required for reducing the size of the motor and increasing the efficiency of the motor, thus increasing the cost extremely due to the use of rare earth magnets for the purpose.

SUMMARY OF THE INVENTION

An object of the present invention is to provide a control apparatus capable of automatically operating a synchronous motor smoothly from the start up to high speed operation by the use of a simple starting device.

Another object of the invention is to provide a synchronous motor control apparatus which is capable of maintaining the load current of a synchronous motor substantially constant over a range of high to low speeds.

To accomplish the above objects, in accordance with the invention there is thus provided a synchronous motor control apparatus including:

a polyphase synchronous motor 2, a frequency adjusting circuit 14 responsive to the closing of a power supply switch 3 to generate a frequency control signal for commanding the frequency of oscillation to increase linearly from zero to a given high frequency, a polyphase rectangular wave oscillation circuit 16 whose oscillation frequency for polyphase rectangular waves is controlled in accordance with the frequency control signal, an energization phase adjusting circuit 20 for generating a phase control signal in accordance with a signal related to the frequency control signal from the frequency adjusting circuit, an energization phase computing circuit 18 for controlling the phases of the polyphase rectangular oscillation frequency of the polyphase rectangular oscillation circuit in accordance with the phase control signal, and a drive circuit 24 for amplifying the polyphase rectangular signals generated from the energization phase calculating circuit to apply the same to the field winding of the motor.

DESCRIPTION OF THE PREFERRED EMBODIMENT

Figure 1:
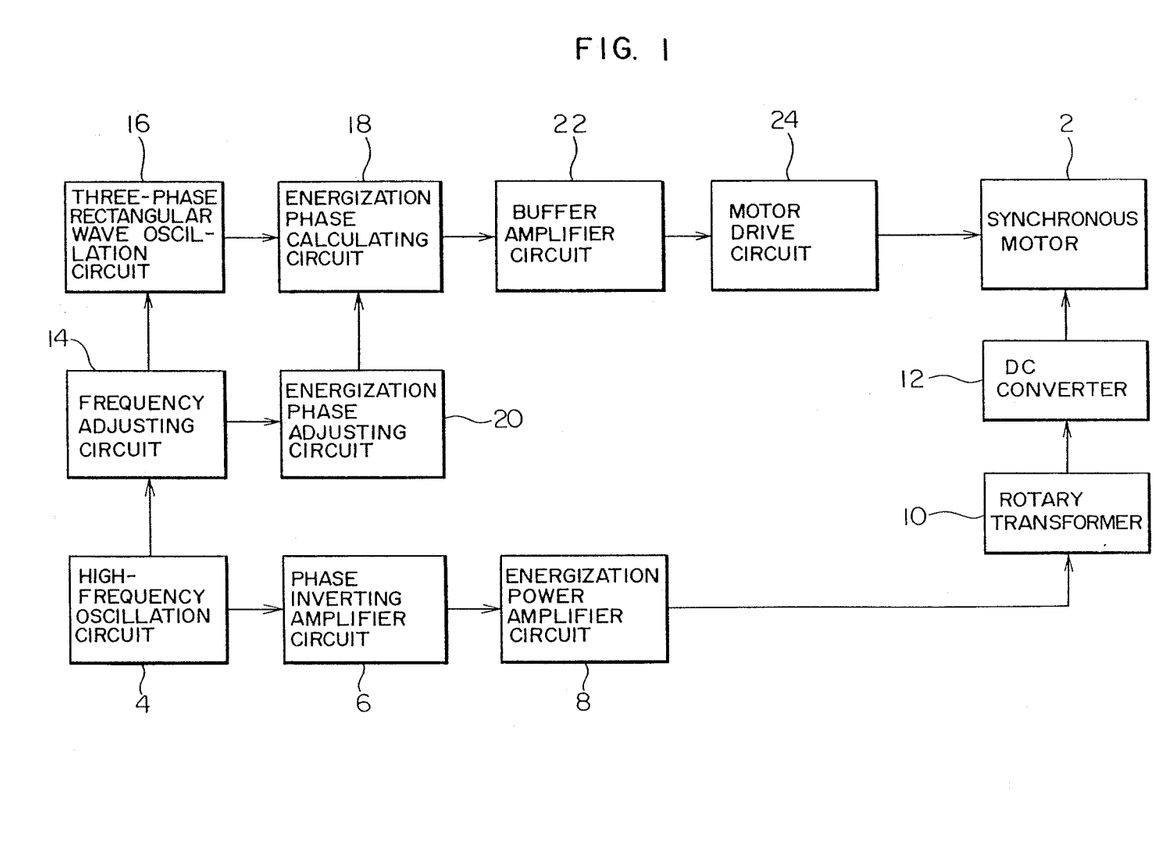
FIG. 1 is a block diagram for a typical example of a synchronous motor control apparatus according to the invention.

Referring to FIG. 1, there is illustrated a block diagram for a typical example of a synchronous motor control apparatus according to the invention.

In the Figure, numeral 2 designates a polyphase synchronous motor which in this embodiment is assumed to be a three-phase synchronous motor. Numeral 4 designates a high-frequency oscillation circuit whose oscillation frequency is several tens kHz. The oscillation frequency is selected high for the purpose of efficiently supplying an excitation current to the armature of the motor by the small apparatus. The output oscillation signal is applied to a frequency adjusting circuit 14 so as to be used as a start signal for the motor and it is also applied to a phase inverting amplifier circuit 6 which in turn generates positive-phase and negative-phase signals. The output signals from the amplifier circuit 6 are amplified by an energization power amplifier circuit 8 to energize the primary side of a rotary transformer 10. The rotary transformer 10 is composed of a high-frequency transformer so that the high frequency amplified by the energization power amplifier circuit 8 is supplied to the rotor of the motor in a noncontact manner with greater efficiency and it has its primary side fixed and its secondary side attached to the main shaft of the motor for rotation along with the rotor.

The high frequency signal supplied from the secondary side of the rotary transformer 10 is rectified by a dc converter 12 comprising a full-wave rectifier and supplied to the armature coil of the rotor.

Numeral 16 designates a three-phase rectangular wave oscillation circuit. Conventional three-phase rectangular oscillation circuits are such that ring-counter oscillators or the like are used to generate successive rectangular waves and these waves are combined to produce three phase rectangular waves. Thus, these conventional circuits are complicated in circuit construction. The oscillation circuit used with the invention is designed so that it is formed with a very small number of elements.

Numeral 14 designates a frequency adjusting circuit for controlling the oscillation frequency of the three-phase rectangular wave oscillation circuit 16. In other words, this circuit is responsive to the output signal from the high-frequency oscillation circuit 4 to control the oscillation frequency of the three-phase rectangular wave oscillation circuit 16 to change from a low to a higher frequency during the starting period of the motor and it also makes it possible to vary the frequency of the stable three phase rectangular waves over a wide range to control the speed of the motor through a wide range.

An energization phase adjusting circuit 20 is responsive to the output signal of the frequency adjusting circuit 14 to apply to an energization phase calculating circuit 18 a signal for controlling the phases of the output rectangular waves of the three-phase rectangular wave oscillation circuit 16 to control the phases of the three-phase rectangular waves.

With the conventional synchronous motor, while, even for the same load torque, the load current is reduced to some extent and a certain amount of efficiency is attained at a high speed operation, the load current is increased at an accelerating rate with decrease in the speed thereby rendering the motor unfit for use. Thus, it has been difficult to effect continuous speed control of the synchronous motor. Therefore, in the present apparatus the energization phase adjusting circuit 20 controls the phases of the three phase rectangular wave in such a manner that only the necessary current for the development of driving torque is supplied and the other current not required for the driving torque development is cut off.

The energization phase calculating circuit 18 is responsive to the phase control signal from the energization phase adjusting circuit 20 to control the phases of the three phase rectangular signals so as to increase the efficiency of the motor and apply the signals to a buffer amplifier circuit 22.

The buffer amplifier circuit 22 is an amplifier circuit for relieving the danger of a stable phase control being prevented by the occurrence of a striking change in the load when a motor drive circuit 24 is directly connected to the energization phase calculating circuit 18. Therefore, this circuit includes an ordinary inverter amplifier.

Figure 2:
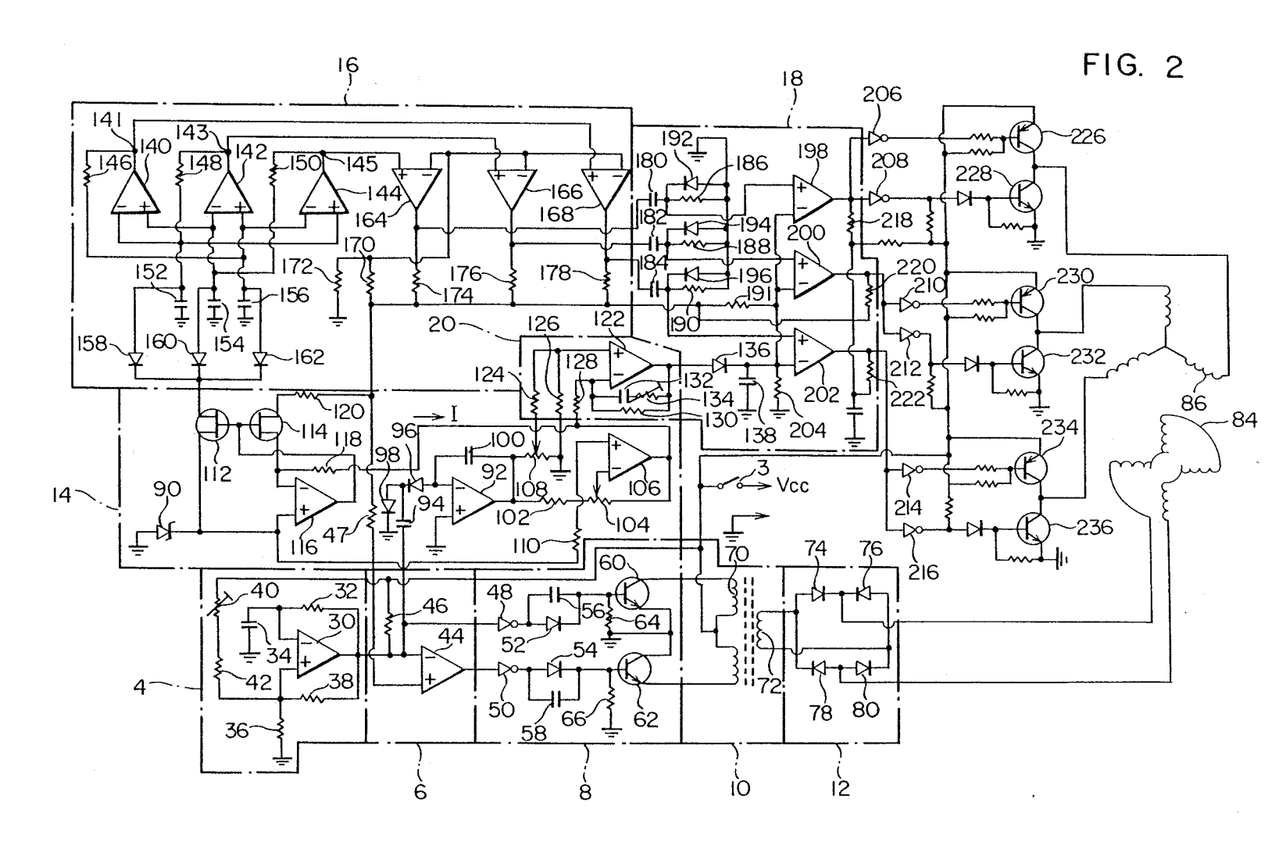
FIG. 2 is a circuit diagram for a typical embodiment of the synchronous motor control apparatus according to the invention.

FIG. 2 shows a circuit diagram for a typical embodiment of the synchronous motor control apparatus according to the invention.

The high-frequency oscillation circuit 4 includes an operational amplifier 30 whose inverting input is connected to a capacitor 34 and to its output terminal through a resistor 32 and whose noninverting input is connected to a dc power source $V_{cc}$ through a resistor 42, a semifixed resistor 40 and a power supply switch 3.

The oscillator frequency is determined by the value of the resistor 32 and the capacitance of the capacitor 34 and in the present embodiment it is adjusted to several tens kHz in consideration of the core material of the rotary converter 10, etc. Also, the semifixed resistor 42 is provided for fine adjustment of the duty cycle of the oscillation frequency and thus the duty cycle is adjusted to about 50%.

The phase inverting amplifier circuit 6 includes an operational amplifier 44 whose inverting input is supplied with the oscillation voltage from the operational amplifier 30 and whose noninverting input is connected to a Zener diode 90 to receive a constant voltage of about half the amplitude of the oscillation voltage. As a result, the output waveform of the operational amplifier 44 is opposite in phase to the output waveform applied from the operational amplifier 30 to an inverter 48. These positive-phase and negative-phase high frequency signals are respectively applied to capacitors 56 and 58 of the energization power amplification circuit 8 through the invertors 48 and 50 functioning as buffer amplifiers. The capacitors 56 and 58 are pull-up capacitors for maintaining the waveforms of the positive-phase and negative-phase high frequency signals in rectangular form and their outputs are respectively amplified by transistors 60 and 62 which in turn supply the outputs to the primary winding of the rotary transformer 10.

In this connection, diodes 52 and 54 are reverse current blocking diodes.

The rotary transformer 10 includes high-frequency soft cores made of ferrite material and it is constructed so that the transformer primary core and primary winding are secured to the external form of the motor and the secondary core and the secondary winding are mounted on the main shaft of the motor for rotation along with the rotor.

Thus, the high frequency signals from the energization power amplifier circuit 8 are induced in the secondary side of the rotary transformer 10, converted to dc current by the dc conversion circuit 12 including a full-wave rectifier having diodes 74 to 80 and then applied to an armature winding 84.

Figure 3:
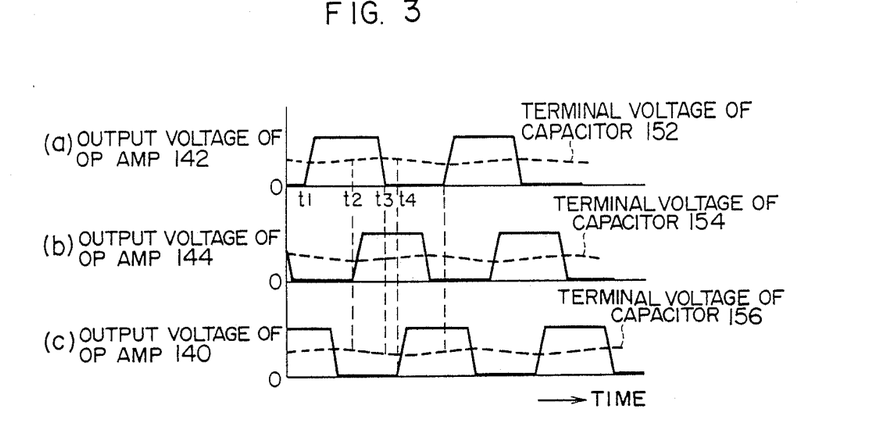
FIGS. 3 and 4 respectively show a plurality of waveforms generated at various parts in the three-phase rectangular wave oscillation circuit.

The operation of the three-phase rectangular oscillation circuit 16 will now be described. This oscillation circuit has a simple circuit construction including operational amplifiers 140, 142 and 144 for generating three phase rectangular waves. Firstly, when these elements are connected as shown and supplied with the supply voltage, due to the fact that the three operational amplifiers are not completely identical in characteristics, a voltage is generated first at the output terminal of any one of the operational amplifiers. FIG. 3 is a time chart showing the signal waveforms generated at various parts of the oscillation circuit 16.

Thus, assuming that the voltage is generated at an output terminal 143 of the operational amplifier 142, the voltage is applied to a semifixed resistor including an FET 112 via a resistor 148 and a diode 158. Also, a capacitor 152 is charged in dependence on the ratio between the resistor 148 and the FET 112 and its charging curve is determined by a time constant which is dependent on the resistance values of the resistor 148 and the FET 112 and the capacitance of the capacitor 152. Consequently, by varying the resistance value of the FET 112, the charging curve is also varied. Also, at this time the charged voltage on the capacitor 152 is applied to the negative terminal of the operational amplifier 140 and the positive terminal of the operational amplifier 144 which are connected to the positive terminal of the capacitor 152 and the applied voltage is increased in accordance with the charging curve. The fact that the voltage is generated at the output terminal of the operational amplifier 142 indicates that the negative terminal of the operational amplifier 142 is lower in voltage than its positive terminal. Then, the positive terminal of the operational amplifier 140 is the same in potential with the negative terminal of the operational amplifier 142 and the negative terminal of the operational amplifier 144 is the same in potential with the positive terminal of the operational amplifier 142. As a result, the positive terminal of the operational amplifier 140 is lower in potential than the negative terminal of the operational amplifier 144. However if the voltage is generated at the output terminal of the operational amplifier 142 at a time $t_1$ as shown in (a) of FIG. 3, as mentioned previously, the capacitor 152 is charged so that its terminal voltage is increased as shown by the broken line in (a) of FIG. 3 and thus the potentials at the negative terminal of the operational amplifier 140 and the positive terminal of the operational amplifier 144, which are connected to the capacitor 152, are also increased. When this occurs, the operational amplifier 140 is maintained out of operation. On the other hand, the potential at the positive terminal of the operational amplifier 144 (the terminal voltage of the capacitor 152)

attains the potential of its negative terminal (the terminal voltage of a capacitor 156) at a time $t_2$ and the operational amplifier 144 comes into operation, thus causing its output potential to go to a high level.

When the output of the operational amplifier 144 goes to the high level, this output causes the terminal potential of a capacitor 154 to increase with a time constant determined by a resistor 150, the FET 112 and the capacitor 154 as in the case of the capacitor 152.

Thus, the potentials at the negative terminal of the operational amplifier 142 and the positive terminal of the operational amplifier 140, which are connected to the terminal of the capacitor 154, are increased after the time $t_2$ so that when eventually the potential at the negative terminal of the operational amplifier 142 (the terminal voltage of the capacitor 154) attains the potential at its positive terminal (the terminal voltage of the capacitor 156) at a time $t_3$, the operational amplifier 152 comes out of operation and its output potential goes to a low level. When this occurs, the stored charge on the capacitor 152 is discharged through the diode 158 and the FET 112. At this time, the charging curve is determined by a time constant which is dependent on the resistance value of the FET 112 and the capacitance of the capacitor 152.

In this case, the discharge curve can be varied by varying the resistance value or the gate voltage of the FET 112 as in the case of the charging curve. While, at the time $t_3$, the positive terminal of the operational amplifier 144 is higher in potential than its negative terminal thus generating a high level voltage from its output terminal, when the operational amplifier 142 comes out of operation, the terminal voltage of the capacitor 152 starts to decrease and hence the potentials at the positive terminal of the operational amplifier 144 and the negative terminal of the operational amplifier 140 start decreasing.

On the other hand, while the potential at the positive terminal of the operational amplifier 140 (the terminal voltage of the capacitor 154) is lower than that at its negative terminal (the terminal voltage of the capacitor 152) thus bringing it out of operation, after the time $t_2$ the potential at the positive terminal increases and the potential at the negative terminal decreases. Consequently, the potential at the positive terminal attains the potential at the negative terminal and the operational amplifier 140 comes into operation. In this way, the operational amplifiers 140, 142 and 144 are sequentially brought into operation to produce three phase rectangular oscillations.

The oscillation frequency can be adjusted by varying the resistance value or the gate voltage of the FET 112. It is to be noted that the diodes 158, 160 and 162 are reverse current blocking diodes so that the time constants of the three operational amplifiers 140, 142 and 144 can be varied by using only the single FET 112 and also varying these time constants by using only the single FET prevents the occurrence of variations in the duty cycle of the oscillation frequency due to the variations in resistance changes.

Figure 4:
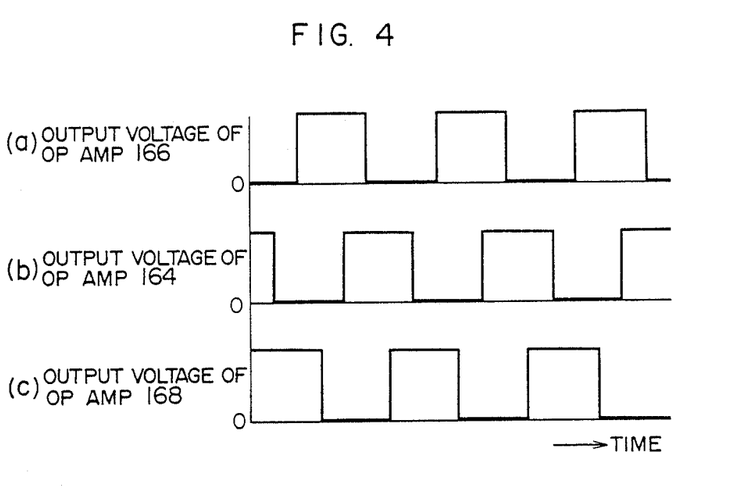

The outputs of the operational amplifiers 140, 142 and 144 are respectively applied to the positive terminals of the corresponding operational amplifiers 168, 166 and 164 whose outputs are in turn applied to the energization phase computing circuit 18. The negative terminals of the operational amplifiers 164 to 168 are grounded through a resistor 172 so that their input signals are compared with the terminal voltage of the resistor 172 and their resulting output waveforms are shaped into three phase rectangular waveforms as shown in FIG. 4.

Next, the operation of the frequency adjusting circuit 14 will be described.

The motor used with this invention is a synchronous motor and therefore it is conceivable to use, as its starting method, a process in which during the initial period of starting a current of very low frequency is supplied and the frequency is gradually increased to finally attain a specified frequency and thereby attain a specified speed. Thus, this circuit is designed so that such starting operation is performed automatically.

The rectangular signal from the high-frequency oscillation circuit 14 flows to a capacitor 100 through a pump circuit including a capacitor 94 and diodes 96 and 98. The pump circuit-side terminal of the capacitor 100 is connected to the negative terminal of an operational amplifier 92 and the other terminal is connected to its output. Thus, the resistor 108-side potential of the capacitor 100 takes the form of a stairstep waveform of a good linearity which increases in voltage by one step each time a rectangular signal is applied. Therefore, the slope of the stairstep waveform can be adjusted by adjusting the capacitance values of the capacitors 94 and 100, for example. In this way, the output voltage of the operational amplifier 92 increases in steps from zero voltage up to near the power supply voltage and it is applied to the positive terminal of an operational amplifier 122 through the variable resistor 108 and resistors 124 and 126 and to the negative terminal of an operational amplifier 106 through a resistor 102 and a variable resistor 104.

While the operational amplifier 106 is an inverting amplifier capable of providing variable amplification by means of the variable resistor 104, it in fact functions as a diminishing amplifier. After the connection of the power source, the output of the operational amplifiers 92 and 106 respectively become as shown in ($a$) and ($b$) of FIG. 5. In other words, a Zener diode 90 applies a constant positive voltage to the positive terminal of the operational amplifier 106 through a resistor 110, so that the output of the operational amplifier 106 is inverted to produce a stairstep voltage of a downward slope arbitrarily diminished by the variable resistor 104.

The output voltage of the operational amplifier 106 is applied to the energization phase adjusting circuit 20 and to the source of an FET 114 and the negative terminal of an operational amplifier 116 through a resistor 118. In this case, the output of the operational amplifier 106 decreases in accordance with the anode-side terminal voltage of the Zener diode 90 as a reference potential. The power supply voltage is applied to the drain of the FET 114 through a resistor 120 and therefore a current I flows to the output terminal of the operational amplifier 106 from the power supply $V_{cc}$ via the resistor 120, the FET 114 and the resistor 118. At this time, the output of the operational amplifier 106 automatically controls the gate voltage of the FET 114 in a manner that its negative terminal becomes a zero potential. Thus, the internal resistance of the FET 114 becomes $V_{cc}/I$. For this reason, the FET 112 is selected to have the corresponding characteristics to form a pair with the FET 114 so that their gate voltages are the same and thus the internal resistance of the FET 112 has the same value as the FET 114. Then, since the output of the operational amplifier 106 decreases in steps, the current I also increases in proportion to the output voltage of the operational amplifier 106 so that the gate voltages to the FETs 112 and 114 are increased and the values of their internal resistances are decreased. Thus, the FET 112 serves as a variable resistor as mentioned previously. Consequently, during the initial period after the connection of the power source the oscillation frequency of the three-phase rectangular oscillation circuit 16 is a very low frequency and then it is gradually increased to attain a specified frequency, thereby automatically completing the starting of the synchronous motor. Also, by combining the FETs 112 and 114 and the operational amplifier 116, it is possible to minimize the frequency variations with temperature. In addition, by adjusting the variable resistor 104, it is possible to arbitrarily designates the minimum value of the output stairstep waveform of the operational amplifier 106, that is, the maximum value of the oscillation frequency. It is to be noted that the gate voltage of the FET 112 corresponds to the previously mentioned frequency control signal.

Next, the operation of the energization phase adjusting circuit 20 will be described. In this circuit, the positive terminal of the operational amplifier 122 is connected to the resistor 108 through the parallel connected resistors 124 and 126 to receive the stairstep output voltage of the operational amplifier 92 and the amplitude value of this input voltage is adjusted as desired by the variable resistor 108. On the other hand, the negative terminal of the operational amplifier 122 is supplied with the output stairstep voltage of the operational amplifier 106 through a resistor 128. Thus, the operational amplifier 122 functions as a noninverting amplifier so that the difference voltage between the input voltages to its positive and negative terminals is amplified and outputted. This output voltage has a waveform of a given slope as shown in (c) of FIG. 5 and it is applied as a phase control signal to the energization phase calculating circuit 18. Thus, the input voltage to the positive terminal of the operational amplifier 122 is adjusted by the resistor 108 to vary the slope of its output waveform to adjust the energization phase and the input voltage to the negative terminal serves to automatically attain the optimum energization phase against variations in the frequency, thereby computing and outputting the output signal of the operational amplifier 122.

The thus produced phase control signal is applied as a reference input voltage to the negative terminal of each of operational amplifiers 198, 200 and 202 of the energization phase calculating circuit 18 through a diode 136. On the other hand, the positive terminals of the operational amplifiers 198, 200 and 202 are respectively supplied with the output three phase rectangular waveforms of the corresponding operational amplifiers 164, 166 and 168 (FIG. 4) through capacitors 180, 182 and 184, respectively. Here, one phase of the three phase rectangular waveforms, e.g., the output of the operational amplifier 164 will be explained. The output rectangular waveform of the operational amplifier 164 ((b) of FIG. 4, (a) of FIG. 6) is differentiated by a differentiator including the capacitor 180 and a resistor 186 ((b) of FIG. 6) and applied to the positive terminal of the operational amplifier 198. Note that the maximum value of this differentiated waveform is constant with frequency. Also, the final peak value of each differentiated waveform decreases as the frequency decreases.

Figure 5:
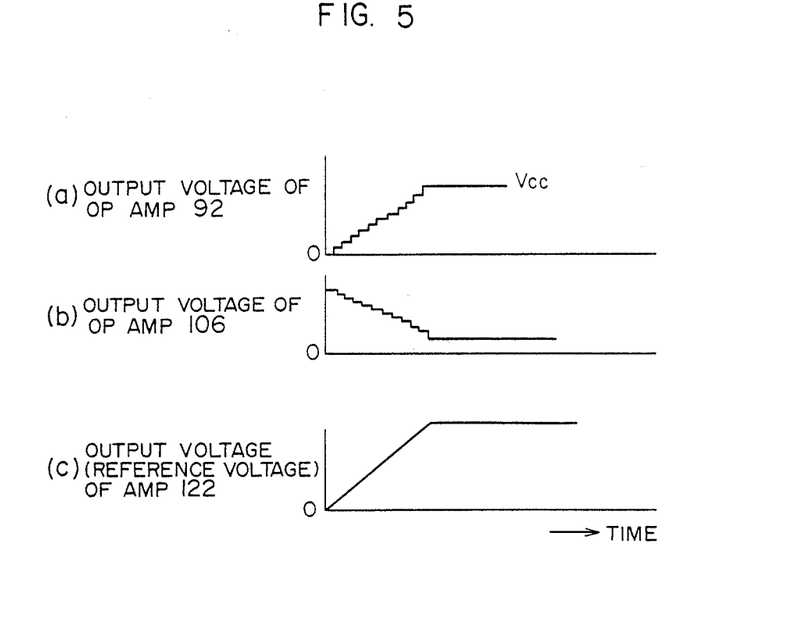
FIG. 5 shows a plurality of waveforms generated at various parts in the frequency adjusting circuit and the energization phase adjusting circuit.
Figure 6:
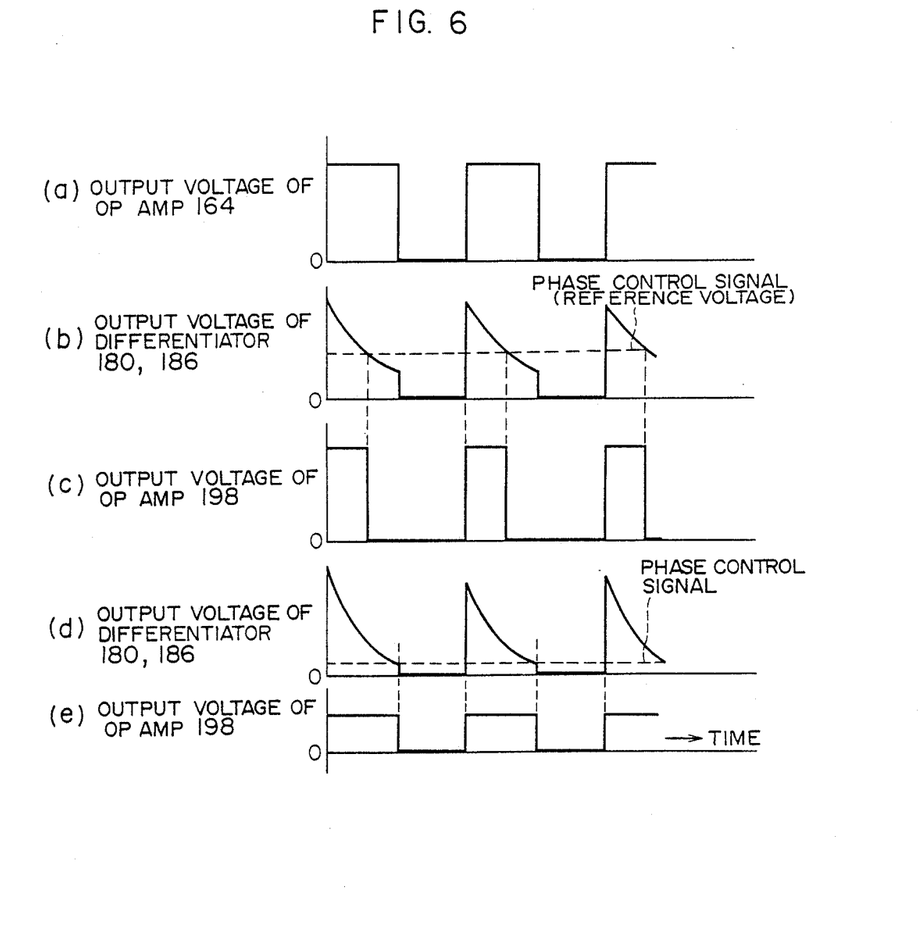
FIG. 6 shows a plurality of waveforms generated at various parts in the energization phase calculating circuit.

In this way, the differentiated waveform in (b) of FIG. 6 is applied to the positive terminal of the operational amplifier 198 and its negative terminal is supplied with the phase control signal shown in (c) of FIG. 5 as the reference voltage shown in (b) of FIG. 6. Thus, the operational amplifier 198 generates the rectangular waveform shown in (c) of FIG. 6. With this output rectangular waveform, immediately after the starting the final peak value of the differentiator is low as shown in (d) of FIG. 6 and the level of the phase control signal is also low, thus increasing the duty cycle of the output voltage from the operational amplifier 198 as shown in (e) of FIG. 6. Then, as the motor speed increases, the final peak value of the differentiator is increased and the level of the phase control signal also substantially follows the final peak value, thus causing the duty cycle of the output voltage from the operational amplifier 198 to remain substantially unchanged and large. When the speed eventually becomes higher, the level of the phase control signal becomes higher than the final peak value as shown in (b) of FIG. 6, thus decreasing the duty cycle. In this way, the duty cycle is controlled as the speed is increased. As mentioned previously, the output frequency of the operational amplifier 198 gradually increases from the very low frequency after the starting in response to the decreasing of the output voltage of the operational amplifier 106 of the frequency adjusting circuit 14 (FIG. 5) and its maximum frequency is adjusted by the variable resistor 104. On the other hand, its duty cycle is decreased with increase in the output voltage of the operational amplifier 122 of the energization phase adjusting circuit 20 ((c) of FIG. 5) or the reference voltage and its minimum duty cycle is adjusted by the variable resistor 108. Diodes 192, 194 and 196 are each provided to rapidly discharge the stored charge in corresponding one of the capacitor 180, 182 and 184 when the input voltage from the three-phase rectangular wave oscillation circuit 16 is reduced to zero.

The outputs of the operational amplifiers 198, 200 and 202 are applied to a field winding 86 of the synchronous motor 2 through the buffer amplifier circuit 22 and the motor drive circuit 24.

With the construction described above, the synchronous motor control apparatus has the following effects.

When starting the motor, the energization frequency for the motor is increased from a very low frequency up to a given high frequency with a given slope in accordance with decrease in the output voltage of the operational amplifier 106 and the rise time from the low speed up to the maximum speed is constant, thereby starting the motor stably. This is due to the construction of the three-phase rectangular oscillation circuit such that stable three-phase rectangular oscillations are always ensured over a range of low to high frequencies with its rise time being maintained constant by the linearity of the output stairstep waveform of the operational amplifier 106, and the maximum frequency is determined by the resistor 104.

As regards the driving torque of the motor, a substantially constant output torque can be obtained over a range of low to maximum speeds. This purpose is achieved by computing and controlling the load current of the motor.

With the synchronous motor employing rectangular waves, the load current is very large at low speeds and it gradually decreases as the speed increases, thus making it difficult to continuously control the load current under the conditions of high to low speeds in the motors of the same specifications. Therefore, in the apparatus of this invention any current not contributing to the production of torque is computed by the energization phase computing circuit and the energization is effected in this phase, thus always controlling the load current automatically at the optimum phase energization angles for the frequency. Consequently, substantially constant load current and load torque are ensured through a range of high to low speeds, thus making it possible to operate the motor with high efficiency.

Further, since the present synchronous motor employs the system of energizing the rotor and also adopts the high-frequency rotary transformer to realize a non-contact system for the power supply method, not only the motor is reduced in size and enhanced in efficiency but also the overall efficiency of the motor is increased through the generation of intense magnetic fields.

Moreover, the high frequency signal supplied to the rotary transformer is also supplied simultaneously to the frequency adjusting circuit and thus it is possible to use the high frequency oscillator 4 alone in common.

While, in the above-described embodiment, the rotary transformer is used so that the output frequency of the high-frequency oscillation circuit is rectified and supplied to the rotor of the motor through the rotary transformer the core of the rotor may be composed of the ordinary permanent magnets.

Still further, the present invention is not limited to the foregoing three-phase synchronous motor and it is equally applicable to two-phase and four-phase synchronous motors. In such cases, it is only necessary to suitably modify the phase of the operational amplifier 142, the capacitor 152 and the diode 158 in the rectangular oscillation circuit 16 in accordance with the number of phases.

I claim:

1. A synchronous motor control apparatus comprising:
   a polyphase synchronous motor;
   a frequency adjusting circuit responsive to the closing of a power supply switch to generate a frequency control signal for commanding to linearly increase an oscillation frequency from zero up to a given high frequency;
   a polyphase rectangular wave oscillation circuit whose oscillation frequency for polyphase rectangular waves is controlled in accordance with said frequency control signal;
   an energization phase adjusting circuit for generating a phase control signal in accordance with a signal related to said frequency control signal from said frequency adjusting circuit;
   an energization phase calculating circuit for controlling the phases of the polyphase rectangular oscillation frequency of said polyphase rectangular oscillation circuit in accordance with said phase control signal; and
   a drive circuit for amplifying output polyphase rectangular signals of said energization phase calculating circuit and applying the same to a field winding of said motor.

2. An apparatus according to claim 1, wherein said polyphase rectangular oscillation circuit is a three-phase rectangular oscillation circuit comprising first, second and third operational amplifiers, and first, second and third time constant means respectively connected to outputs of said first, second and third operational amplifiers, said first time constant means being connected to a negative terminal of said first operational amplifier and a positive terminal of said third operational amplifier, said second time constant means being connected to a positive terminal of said first operational amplifier and a negative terminal of said second operational amplifier, said third time constant means being connected to a positive terminal of said second operational amplifier and a negative terminal of said third operational amplifier so that outputs from said first, second and third operational amplifiers are supplied as there phase rectangular oscillation signals to said energization phase calculating circuit.

3. An apparatus according to claim 2, wherein said frequency adjusting circuit includes variable resistor means connected to said first, second and third time constant means so that a resistance value of said variable resistor means is controlled by said frequency control signal to change the frequency of said three phase rectangular oscillation signals.

4. An apparatus according to claim 3, wherein said frequency control signal from said frequency adjusting circuit controls the resistance of said variable resistor means so as to gradually increase the frequency of said three phase rectangular oscillation signals from zero after the connection of a power source.

5. An apparatus according to claim 3, wherein said variable resistor means comprises a field effect transistor so that said frequency control signal is applied to a gate of said field effect transistor.

6. An apparatus according to claim 3, further comprising a high-frequency oscillation circuit, and wherein said frequency adjusting circuit comprises means responsive to an output signal of said high-frequency oscillation circuit to generate a stairstep signal, and means responsive to said stairstep signal to form said frequency control signal so that said frequency control signal controls the resistance value of said variable resistor means in accordance with the level of said stairstep signal.

7. An apparatus according to claim 6, wherein said phase control signal generated from said energization phase adjusting circuit has a level corresponding to the level of said stairstep signal.

8. An apparatus according to claim 7, wherein said energization phase calculating circuit includes first, second and third differentiators for respectively differentiating corresponding phase signals of said three phase rectangular oscillation signals, and first, second and third comparators for respectively comparing output signals of said first, second and third differentiators with said phase control signal so that outputs of said first, second and third comparators are applied to said drive circuit.

9. An apparatus according to claim 6, further comprising a rotary transformer having a primary side thereof connected to an output of said high-frequency oscillation circuit, and a dc converter connected to a secondary side of said rotary transformer and an armature coil of said motor.

* * * * *